Nov. 22, 1938.                    C. MACBETH                    2,137,848
                               AUTOMOBILE CHASSIS
                             Filed March 18, 1938              3 Sheets-Sheet 1
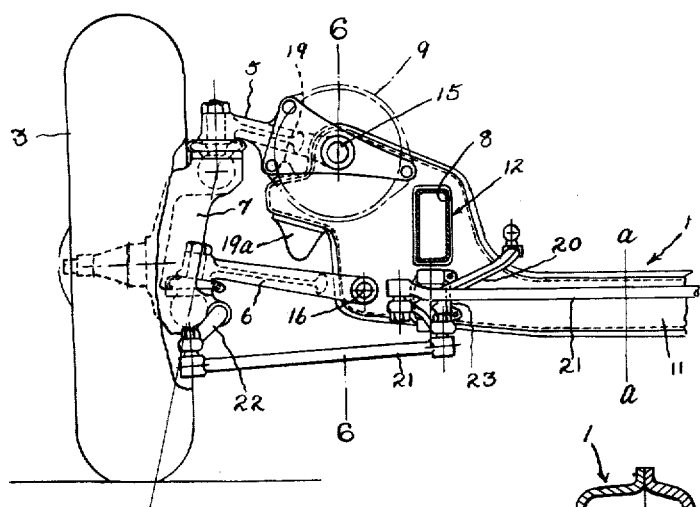
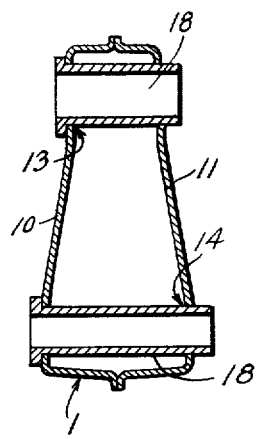
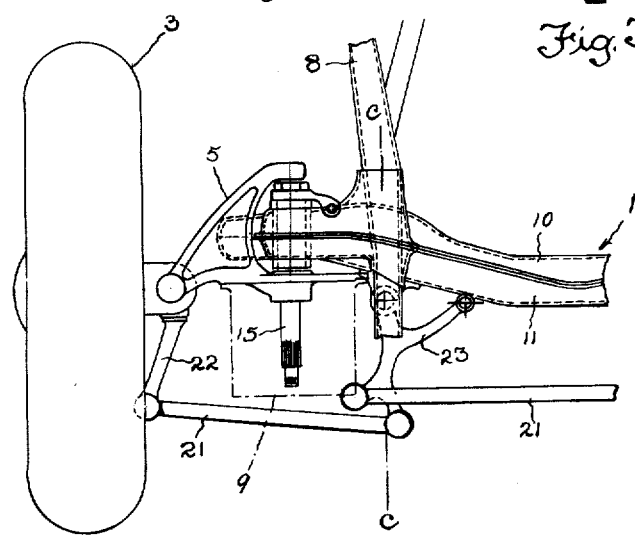
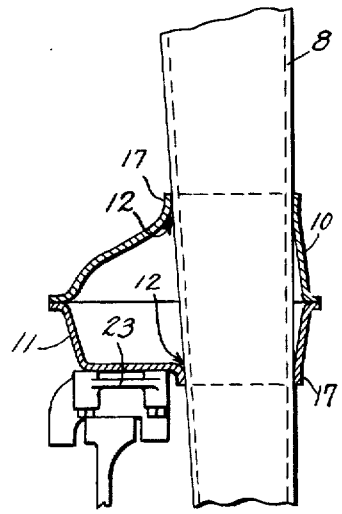
INVENTOR
COLIN MACBETH
BY Albert L. Ely
ATTORNEY

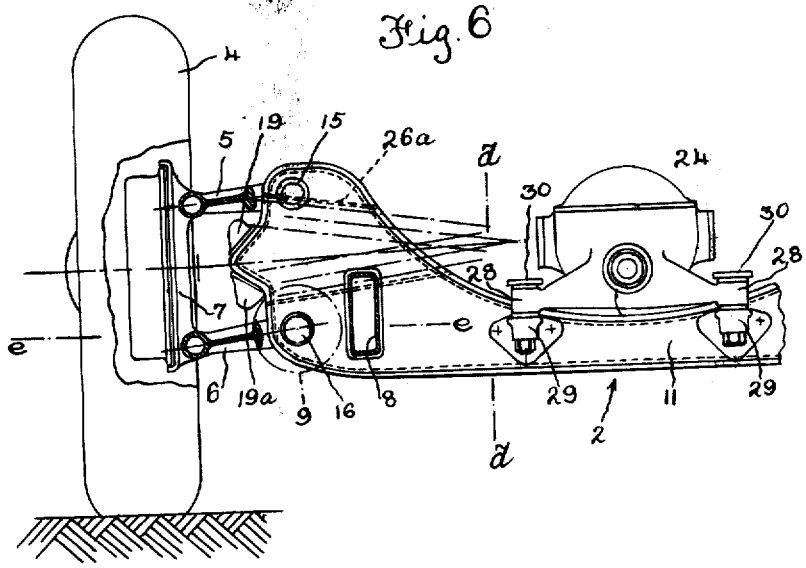
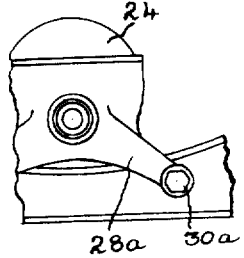
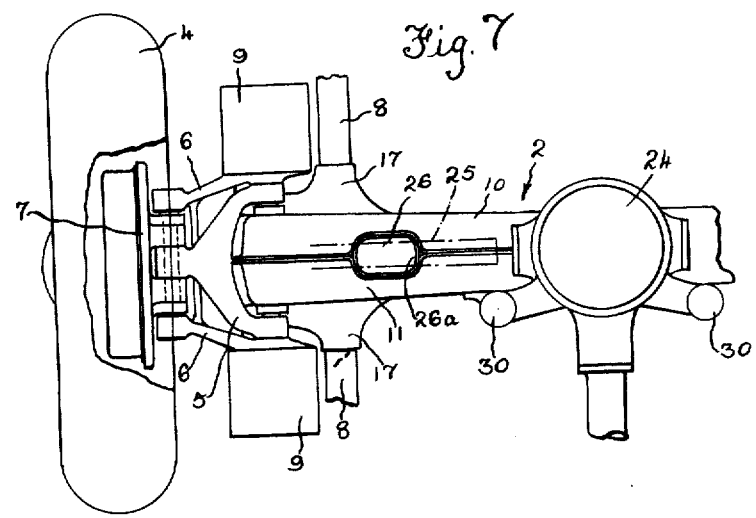
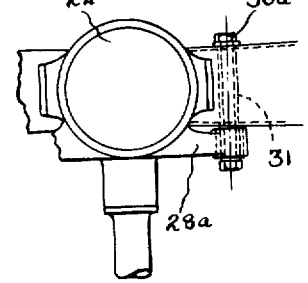

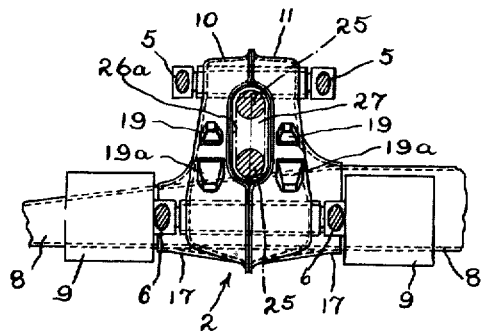
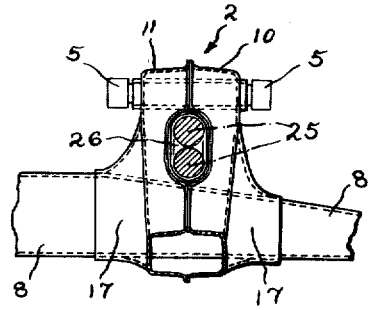
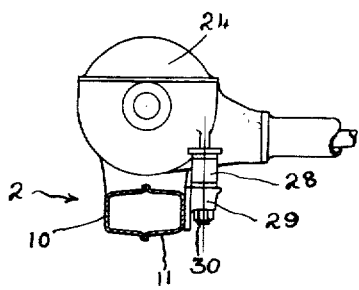
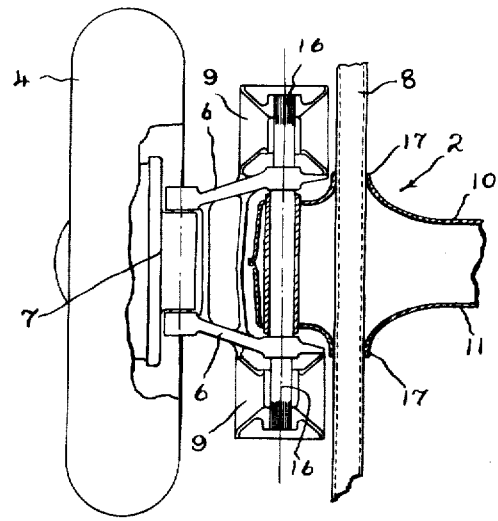

Patented Nov. 22, 1938

2,137,848

UNITED STATES PATENT OFFICE 2,137,848

AUTOMOBILE CHASSIS

Colin Macbeth, Birmingham, England

Application March 18, 1938, Serial No. 196,662
In Great Britain March 16, 1937

4 Claims. (Cl. 280—106.5)

This invention relates to the chassis framework of automobile vehicles, and particularly to the front and rear main cross-members of such framework.

The principal object of the present invention is to provide unitary pressed metal main cross member structures which are capable of effectually withstanding the driving, braking, steering and other stresses that are imposed thereon when the automobile is in service.

A further object of the invention is to provide cross-members which are capable of housing or accommodating the spindles, shafts and like parts appertaining to the suspension arrangements of the automobile road-wheels and of the steering linkages.

Another object of the invention is so to secure the longitudinal side members of the chassis framework within the cross members, that a chassis is produced which is rigid at the wheel-assembly regions.

These and other objects of the invention will become more apparent from a consideration of the accompanying drawings constituting a part hereof, in which like reference characters designate like parts, and in which Figure 1 is a front elevation, partially in section, of part of the front cross-member of an automobile chassis.

Figure 2 is a plan of Figure 1.

Figure 3 is a section through the front cross-member along the line a—a, Figure 1.

Figure 4 is a section through the front cross-member along the line b—b, Figure 1.

Figure 5 is a section through the front cross-member along the line c—c, Figure 2.

Figure 6 is a front elevation, partially in section, of part of the rear cross-member.

Figure 7 is a plan of Figure 6.

Figure 8 is an end elevation of the rear cross-member.

Figure 9 is a section along the line d—d, Figure 6, looking towards the left.

Figure 10 is a part section along the line d—d, Figure 6, looking towards the right.

Figure 11 is a section along the line e—e, Figure 6.

Figures 12 and 13 are an elevation and plan respectively showing an alternative method of locating the final drive or differential gear-box.

The parts of the chassis shown in the drawings are constructed in accordance with a preferred form of carrying out the invention. As shown, the automobile chassis frame has a front cross-member 1, and a rear cross-member 2, on the ends of which the front and rear road wheels 3, 4, are independently suspended by pairs of parallel-motion links 5, 6, articulated, on the one hand, to the said cross-member ends and, on the other hand, to the members 7 that carry the stub-axles of the road wheels. Each pair of links 5, 6, is arranged to oscillate in planes at right angles to the side members 8 of the chassis under the control of rubber torsion springs 9 anchored to the complementary cross-member on the one hand and to one of the relatively rotatable links 5 or 6 on the other hand.

Each cross member 1, 2, is constructed from two channel-section or dished pressings 10, 11, which are welded or otherwise permanently secured to one another around their edges to provide an assembly of box-like section; the dimensions of these pressings vary locally according to the braking and other stresses which the different regions are required to withstand when the automobile is in service, the cross members being given their maximum dimensions in the regions to which the chassis side-members 8 are assembled and to which the articulated links 5, 6, of the wheel-suspension system are connected, thereby enabling the said cross-members to resist the heavy torsional and other stresses which are imposed thereon by the application of the vehicle brakes and when the vehicle is travelling over rough or uneven surfaces.

To provide for the assembly of the chassis side-members 8 and the spindles or shafts 15, 16, to which the articulated links 5, 6, are connected, the pressings of each side member are prepared by piercing or flanging out of each of the steel blanks, a suitably-arranged system of apertures 12, 13, 14, through which the said side members 8, and the spindles 15, 16, respectively, may be passed in assembling the same to the complete cross-member structure.

In the accompanying drawings the apertures 12 of each pressing have been produced by plunging tools, hence each aperture is surrounded by an annular flanging 17 located on the outside of its pressing to provide extended bearings for the assembled side member 8, whereas the apertures 13, 14, have been produced by a piercing operation. However, if desired, the apertures 13, 14, may also be produced by a plunging tool and the aperture 12 may be formed by a piercing operation.

When the said apertures are pierced in the pressings it is desirable (as shown insofar as the apertures 13, 14, are concerned) to insert bearing sleeves or bushes 18 in each cross member as or after the pressings are welded or otherwise assembled into a complete structure, the said sleeves or bushes being preferably permanently secured in position by welding.

The spindles 15, 16, to which the top and bottom wheel-suspension links 5, 6, are connected are fixed within the sleeves 18 and, in the case of the front member 1, the upper spindle 15 extends forwardly of the said member and serves as the static anchorage for one end of the rubber torsion spring 9 whose other end is coupled to the said upper link.

The said spring thus controls the oscillatory rise and fall movements of the links, and, to limit these movements, upper and lower rubber stops or buffers 19, 19ª, are provided upon the ends of the cross-member 1 which are located outwardly of the spindle-apertures 13, 14, and in the paths of oscillation of the said links.

To enable the steering linkage such as shown at 20, 21, 22, to be embodied in the front and/or rear cross-members, a bracket 23 is bolted or otherwise secured to each end of the said member or members below or in close proximity to the side-member aperture 12.

In the accompanying drawings, the driven road wheels are assembled to the rear cross-member 2 and to enable drive to be transmitted from the usual final drive or differential gear-box 24 to the road wheels 4 by means of the Cardan shafts 25 (the extreme positions of oscillation of which are indicated in chain-dotted lines in Figures 6, 8, and 9) additional apertures 26, 27, are formed in each end of the said cross member 2. The outer apertures 27 are deeper than the inner apertures 26 to allow for the angular oscillations of the Cardan shafts 25, and, if desired, a sleeve 26ª may be provided within the rear member between each pair of apertures 26, 27.

The final drive or universal gear-box 24 is supported above the centre of the rear cross-member 2. In Figures 6, 7, and 10, this box and the cross-member are provided with anchoring lugs 28, 29, respectively which register with one another and are provided internally with rubber or similar bushes to enable the said box to be held resiliently in position by bolts 30.

Alternatively, and as shown in Figures 12 and 13 the box may be provided with rubber bushed lugs 28ª which are engaged by bolts 30ª extending through apertures provided in the front and rear walls of the said cross-member 2; the said bolts preferably being passed through sleeves 31 which are housed within the rear cross-member and serve for spacing the front and rear walls of the latter.

It is to be understood that, in the case of automobiles having front-wheel drive, the gear-box 24 will be seated upon and resiliently anchored to the front cross-member 1 and the latter will be provided with the Cardan shaft apertures 26, 27, in a similar manner to that shown in connection with the rear cross-member 2; further, if the automobile is of the type wherein all four road wheels are driven, then a final drive or differential gear-box will be mounted on each of the main front and rear cross-members.

The said rear cross-member 2 also embodies rubber stop members 19, 19ª, for limiting the spring-controlled oscillations of the parallel motion links 5, 6. However, it is preferable, in the case of the rear member, to provide two rubber torsion springs 9 which are carried upon the ends of the spindles 16 of the bottom links 6 on opposite sides of the cross-member, thereby preventing undue restriction in the space occupied by a body assembled to the chassis such as would occur if the said torsion springs were carried upon the spindles 15 of the upper links 5 or if the single larger spring were provided at each end of the cross-member. An additional advantage resulting from the use of two torsion units of reduced dimensions in place of one larger unit, is that an increased ground clearance is obtained.

In building up an automobile chassis in accordance with the present invention, the cross-members 1, 2, are produced by welding or otherwise securing together the complementary pierced or plunger pressing, the bearing sleeves or bushes are inserted into, and secured within their respective apertures and the wheel-suspension system, steering linkages and springing arrangements may be assembled to the cross-members prior to the assembly of the latter to the longitudinal side members of the chassis.

The formation of the apertures 12, 13, 14, for accommodating the bearing sleeves and the side members of the frame, in the ends of the pressings 10, 11, provides a system of points suitable for supporting and locating the said pressings in their correct positions within a welding jig, thereby ensuring that accurate alignment of the various apertures relatively to one another can readily be obtained.

Having described my invention, what I claim and desire to secure by Letters Patent is:—

1. In an automobile chassis having independent wheel suspension linkages pivotally mounted on a frame by means of pivot spindles, a frame comprising longitudinal side members, and front and rear transverse members of box-like section, construction of sheet metal pressings, and having deepened ends in which are formed longitudinally disposed apertures for accommodating the pivot spindles of the wheel suspension linkages and with additional apertures disposed inwardly of said spindle apertures for accommodating the said longitudinal members.

2. In an automobile chassis having independent wheel suspension linkages pivotally mounted on a frame by means of pivot spindles, a frame comprising longitudinal side members, and front and rear transverse members of box-like section, constructed of sheet metal pressings, and having deepened ends in which are formed longitudinally disposed apertures for accommodating the pivot spindles of the wheel suspension linkages, and with additional apertures for accommodating the said longitudinal side members, external annular flanges surrounding said additional apertures providing extended bearings for the longitudinal side members.

3. In an automobile chassis having a steering linkage and independent wheel suspension linkages pivotally mounted on a frame by means of spindles, a frame comprising longitudinal side members, front and rear transverse members each composed of sheet metal pressings secured together to form an assembly of box-like section, and having deepened ends in which are formed longitudinally disposed apertures for accommodating the said longitudinal side members and the spindles for the wheel suspension linkages, and brackets secured to each end of a cross member in close proximity to the apertures for the longitudinal side members and adapted for supporting the steering linkage.

4. In an automobile chassis having independent wheel suspension linkages pivotally mounted on a frame by means of pivot spindles, a frame comprising longitudinal side members, front and rear transverse members each composed of sheet metal pressings secured together to form an assembly of box-like section and provided at each end with longitudinally disposed apertures for accommodating the said longitudinal members and the spindles for the wheel suspension linkages and being deeper in the region of these apertured ends than in the central region between them, anchoring means on the central region of a transverse member for supporting a gear box, and transversely disposed openings in the deepened ends of said transverse member for accommodating drive transmission shafts extended from the gear box.

COLIN MACBETH.

CERTIFICATE OF CORRECTION.

Patent No. 2,137,848.  November 22, 1938.

COLIN MACBETH.

It is hereby certified that error appears in the printed specification of the above numbered patent requiring correction as follows: Page 2, second column, line 14, for the word "plunger" read plunged; line 37, claim 1, for "construction" read constructed; and that the said Letters Patent should be read with this correction therein that the same may conform to the record of the case in the Patent Office.

Signed and sealed this 7th day of February, A. D. 1939.

Henry Van Arsdale.

(Seal)  Acting Commissioner of Patents.

comprising longitudinal side members, front and rear transverse members each composed of sheet metal pressings secured together to form an assembly of box-like section and provided at each end with longitudinally disposed apertures for accommodating the said longitudinal members and the spindles for the wheel suspension linkages and being deeper in the region of these apertured ends than in the central region between them, anchoring means on the central region of a transverse member for supporting a gear box, and transversely disposed openings in the deepened ends of said transverse member for accommodating drive transmission shafts extended from the gear box.

COLIN MACBETH.

CERTIFICATE OF CORRECTION.

Patent No. 2,137,848.                                    November 22, 1938.

COLIN MACBETH.

It is hereby certified that error appears in the printed specification of the above numbered patent requiring correction as follows: Page 2, second column, line 14, for the word "plunger" read plunged; line 37, claim 1, for "construction" read constructed; and that the said Letters Patent should be read with this correction therein that the same may conform to the record of the case in the Patent Office.

Signed and sealed this 7th day of February, A. D. 1939.

Henry Van Arsdale.

(Seal)                                         Acting Commissioner of Patents.